(12) United States Patent
Kaye

(10) Patent No.: US 9,046,741 B2
(45) Date of Patent: *Jun. 2, 2015

(54) LENS CAP ASSEMBLY WITH INTEGRATED DISPLAY

(71) Applicant: Bradley T. Kaye, Leonard, MI (US)

(72) Inventor: Bradley T. Kaye, Leonard, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/555,809

(22) Filed: Nov. 28, 2014

(65) Prior Publication Data

US 2015/0086189 A1  Mar. 26, 2015

Related U.S. Application Data

(63) Continuation of application No. 14/202,723, filed on Mar. 10, 2014, now Pat. No. 8,899,850.

(60) Provisional application No. 61/775,626, filed on Mar. 10, 2013.

(51) Int. Cl.
*G03B 17/00* (2006.01)
*G03B 11/04* (2006.01)

(52) U.S. Cl.
CPC .................... *G03B 11/041* (2013.01)

(58) Field of Classification Search
USPC .......................................................... 396/448
See application file for complete search history.

(56) References Cited

U.S. PATENT DOCUMENTS

| 6,570,621 B2 | 5/2003 | Bigler et al. |
| 6,738,575 B2 | 5/2004 | Kanayama |
| 7,600,931 B2 | 10/2009 | Chang et al. |
| 7,748,627 B2 | 7/2010 | Gelbman |
| 7,756,406 B2 | 7/2010 | Mizumura |
| 2007/0181663 A1 | 8/2007 | Bateman et al. |
| 2012/0211027 A1* | 8/2012 | Francavilla et al. ............ 134/18 |

FOREIGN PATENT DOCUMENTS

| JP | 2004170601 A | 6/2004 |
| JP | 2005051489 A * | 2/2005 ............ H04N 5/225 |

OTHER PUBLICATIONS

BlackRapid New Product Announcement: LensBling, "Trick Out A Variety of Lens Sizes With One-Of-A-Kind Covers", LensBling Product Page, http://www.blackrapid.com/product/hardware/lensbling, May 2, 2013, 3 pp.
International Search Report and Written Opinion dated Jul. 18, 2014, in co-pending International Application No. PCT/US2014/022673, 10 pp.

* cited by examiner

*Primary Examiner* — Clayton E LaBalle
*Assistant Examiner* — Dennis Hancock
(74) *Attorney, Agent, or Firm* — Young Basile Hanlon & MacFarlane P.C.

(57) ABSTRACT

Disclosed are lens cap assemblies wherein a removable lens cap may include a lens cap body that is configured to be removably attached to an end of a lens. The lens cap can further include a cap communication interface configured to receive lens information from a lens communication interface while the lens cap is in an attached position. The lens cap can include a display to allow for the displaying of lens characteristics and information.

19 Claims, 6 Drawing Sheets

LENS CAP ASSEMBLY WITH INTEGRATED DISPLAY

CROSS REFERENCE TO RELATED APPLICATION

This application is a continuation of U.S. patent application Ser. No. 14/202,723 filed Mar. 10, 2014, which claims the benefit of U.S. Provisional Application No. 61/775,626 filed Mar. 10, 2013, both of which are incorporated herein by reference in their entireties.

BACKGROUND OF THE DISCLOSURE

The disclosure relates to optical lenses and lens caps, more specifically to lenses in communication with attached lens caps having an integrated display.

Cameras utilize different lenses to focus an image. Such lenses may be removable from a camera body, and lens caps may be utilized to protect and cover one or both ends of a detached lens. Addressing the identity of individual lenses stored together may be confusing and time-consuming. Though protecting and covering ends of detached lenses is possible, it is difficult to quickly determine information or characteristics of lenses detached from a camera body.

SUMMARY OF THE DISCLOSURE

Disclosed herein are aspects, features, elements, implementations, and embodiments of lens cap assemblies with integrated displays.

In one embodiment a lens cap assembly is disclosed and comprises an optical lens having a lens body having an aperture, a first end, and a second end, wherein the aperture is configured to allow the passage of light. The lens further includes a lens memory including lens information stored therein, a first attachment stop, and a lens communication interface comprising at least one electrical contact. The lens memory and lens communication interface are in electrical communication through one or more electrical conductors. The lens cap assembly further comprises a removable lens cap configured for attachment to at least one of a plurality of optical lenses, having a lens cap body. The cap has a second attachment stop, wherein the lens cap body is configured to be removably attached to the first end of the lens such that the lens cap is at least partially covering the aperture of the lens and the second attachment stop is in stopping abutment with the first attachment stop of the lens when in an attached position. The lens cap further includes a cap communication interface comprising at least one electrical contact. The cap communication interface is configured to be in electrical contact with the lens communication interface in the attached position such that at least a portion of the electrical contacts of the lens communication interface are in electrical communication with at least a portion of the electrical contacts of the cap communication interface. The lens cap further includes a display configured to be in electrical communication with the cap communication interface through one or more electrical conductors and to display the lens information.

In another embodiment, a removable lens cap assembly for a camera lens may comprise a lens cap body. The cap has an attachment stop, wherein the lens cap body is configured to be removably attached to an end of a lens such that the lens cap is at least partially covering an aperture of the lens and the attachment stop is in stopping abutment with a portion of the lens when in an attached position. The lens cap may further include a cap communication interface comprising at least one of electrical contact, and the cap communication interface is configured to be in electrical contact with a lens communication interface in the attached position to receive lens information such that at least a portion of the electrical contacts of a lens communication interface are in electrical communication with at least a portion of the electrical contacts of the cap communication interface. The lens cap may further include a display configured to be in electrical communication with the cap communication interface through one or more electrical conductors and to display the lens information. The lens cap may be attachable to lenses having different lens information.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The description makes reference to the accompanying drawings wherein like reference numerals refer to like parts throughout the several views, and wherein.

DETAILED DESCRIPTION

Lens cap assemblies are described herein that include incorporated displays. The lens caps may be configured to be removably attached to lenses having varying characteristics. In some examples, the lens caps may have a display located on one side that is configured to display information relating to the lens it is attached to. For example, the lens cap may receive an electrical communication from the lens which contains lens characteristic information. By displaying lens information at the lens cap, a user can quickly identify each lens.

As used herein, the terminology "processor" may include a single processor or multiple processors, such as one or more general purpose processors, one or more special purpose processors, one or more conventional processors, one or more digital signal processors, one or more microprocessors, one or more controllers, one or more microcontrollers, one or more Application Specific Integrated Circuits (ASICs), one or more Application Specific Standard Products (ASSPs); one or more Field Programmable Gate Arrays (FPGAs) circuits, any other type or combination of integrated circuits (ICs), one or more state machines, or any combination thereof.

As used herein, the terminology "memory" may include any computer-usable or computer-readable medium or device that can, for example, tangibly contain, store, communicate, or transport any signal or information for use by or in connection with any processor.

As used herein, the terminology "example", "embodiment", "implementation", "aspect", "feature", or "element"

indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Figure 1:
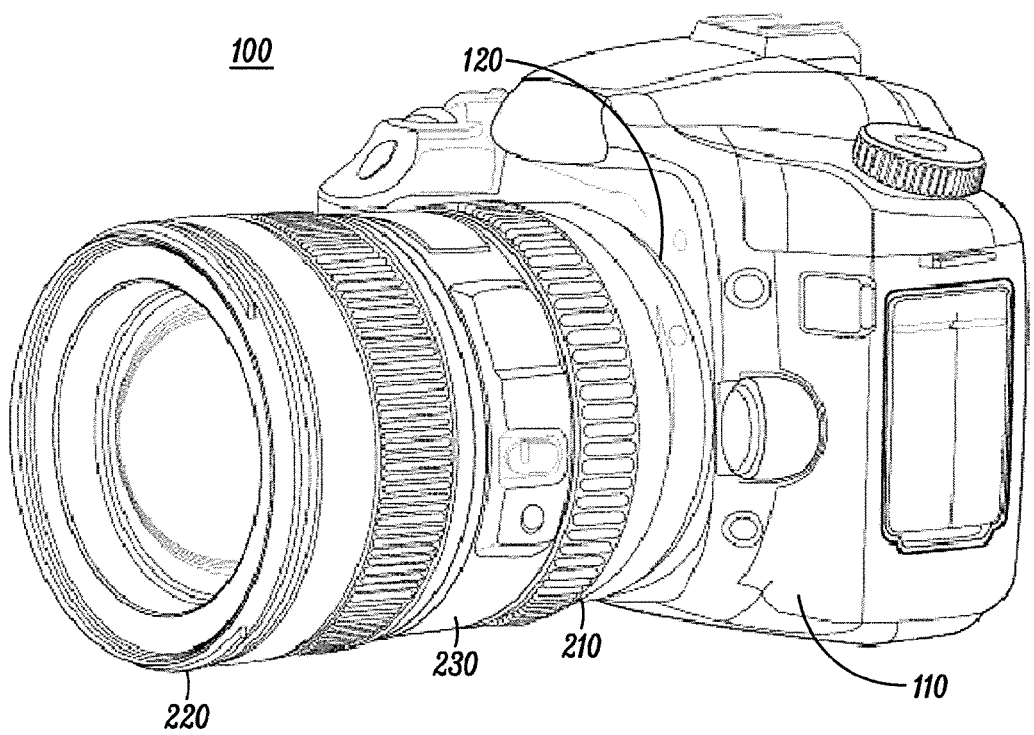
FIG. 1 is a perspective view of a camera assembly.

FIG. 1 is a perspective view of an exemplary camera assembly 100. For simplicity, the camera system 100 shown in FIG. 1 includes a lens 200 and camera body 110; however, other elements, such as multiple lenses, lens extenders, flashes, or other optical accessories may be included in camera assembly 100.

In some embodiments, camera body 110 may comprise any optical instrument capable of recording images. Camera body 110 may be capable of taking still photographs or moving images such as videos or movies. It is contemplated that camera body 110 may record images or videos to a digital format, a film format, or a combination thereof. Camera body 110 may record images to a memory incorporated within camera body 110, and camera body 110 may record images by transmitting them to externally located memory.

In some embodiments, camera body 110 is configured to receive removable lenses, such as lens 200. Camera body 110 may include camera attachment 120, which may be configured to receive one end of lens 200. In some examples, camera body 110 may include a camera controller. The camera controller may be configured to receive or determine lens information relating to lens 200. In some embodiments, camera controller may also control a variety of processes within camera body 110 relating to the capturing of images.

In some embodiments, lens 200 may have a first end 210, a second end 220, and lens body 230. Lens 200 may further include an aperture configured to allow the passage of light through the lens 200. In the example of FIG. 1, first end 210 may be the portion of lens 200 that is attachable to camera body 110. Second end 220 may oppose first end 210 at a distal end of camera assembly 100 when lens 200 is attached to camera body 110. Lens body 230 may include a variety of markings or indicators. In some embodiments, portions of lens body 230 may rotate or move in relation to first or second end 210/220. In some embodiments, different lenses 200 may have different characteristics or features. For example, different lenses may have different focal lengths, which may indicate how strongly the lens converges or diverges light. In some examples, different lenses may have different ratios of a focal length to diameter of entrance pupil, also known as "f-number" or "f-stop." In some embodiments, different lens characteristics can affect images recorded by camera body 110.

Figure 2:
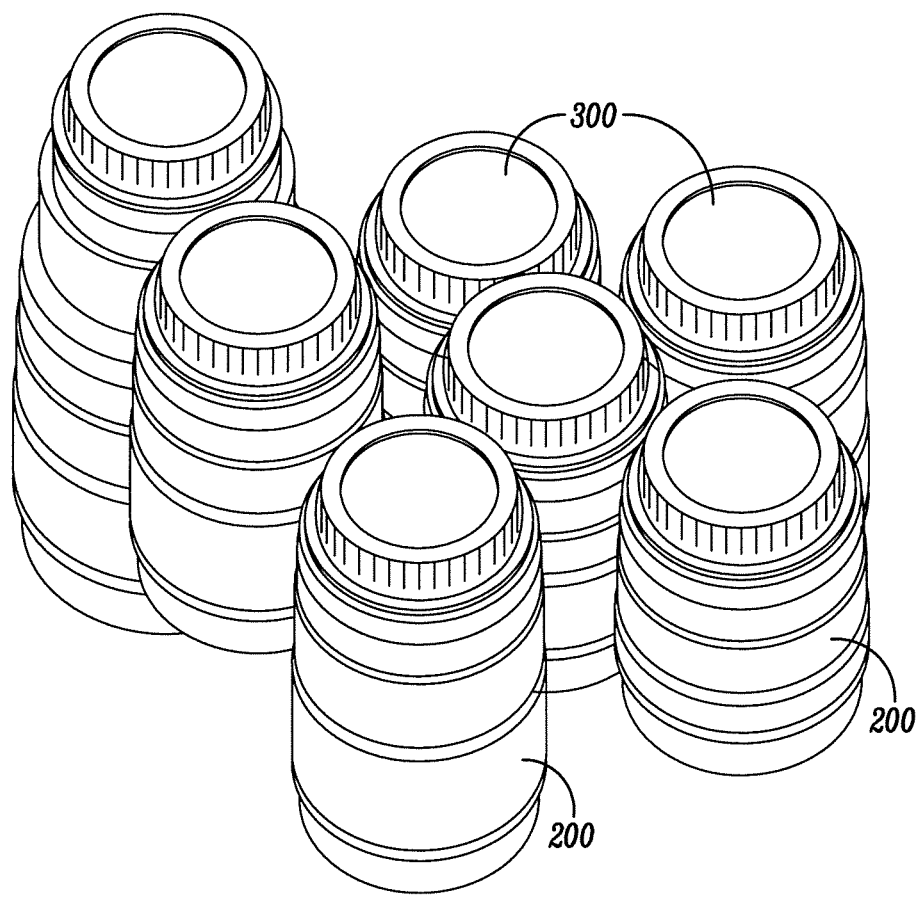
FIG. 2 is a perspective view of a variety of exemplary lenses, each with a lens cap in an attached position.

FIG. 2 is a perspective view of several exemplary lenses 200, each with a lens cap 300 in an attached position. In some embodiments, lens cap 300 may be attached to the first end 210 of lens 200 when lens 200 is detached from camera body 110. In some examples, a variety of shapes and sizes of lenses 200 may be used with a particular camera body 110. That is, lenses having different characteristics may be interchangeable with one camera body 110. Because the first end 210 of each lens 200 may be configured to attach to a common camera body 110, a lens cap 300 may be common to lenses having a variety of characteristics. In some examples, such as the one shown in FIG. 2, lenses 200 may be stored vertically with the first end 210 facing upward. With lens caps 300 on lenses 200, it may be difficult for a user to ascertain the characteristics of each lens 200.

Figure 3:
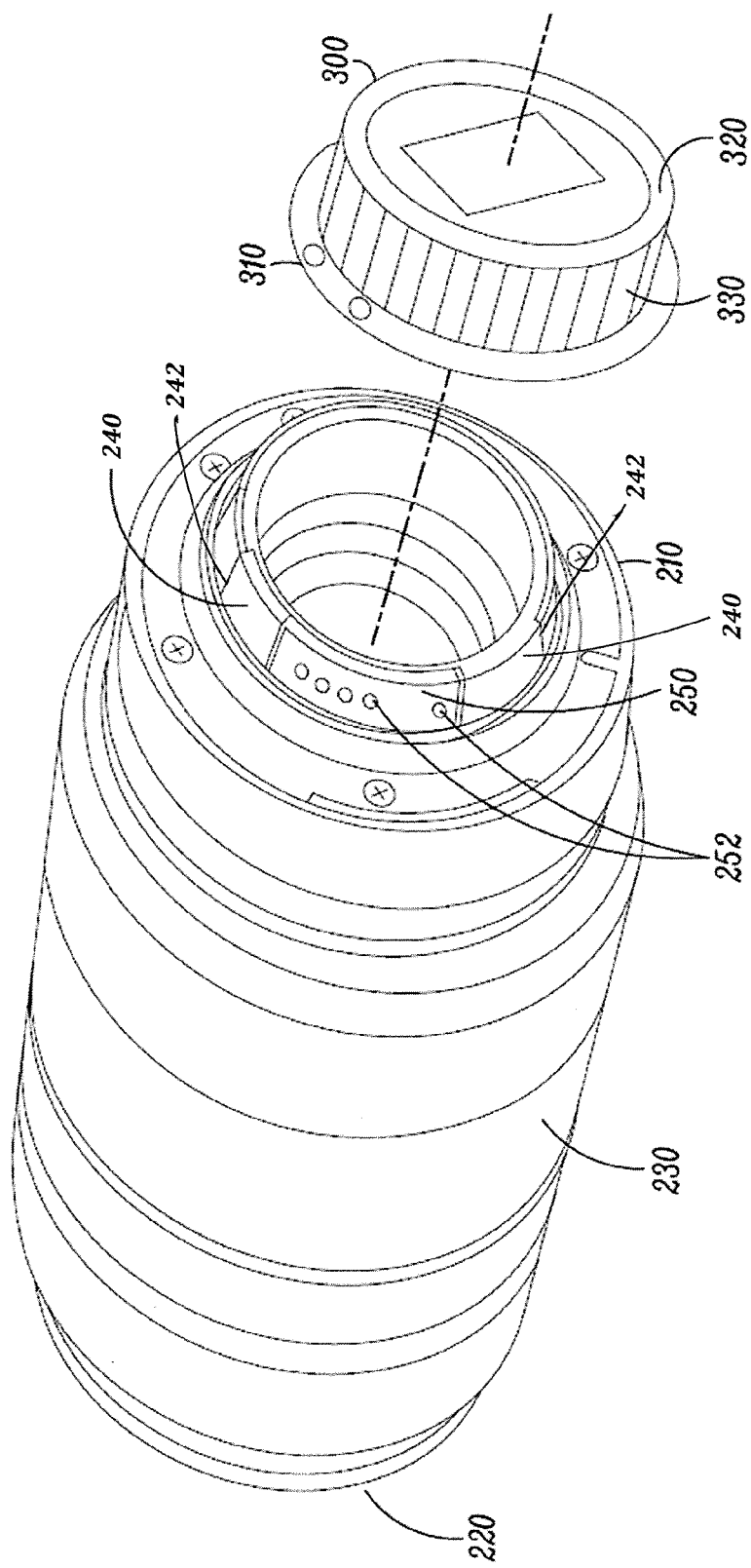
FIG. 3 is an exploded view of an exemplary lens and lens cap.
Figure 4:
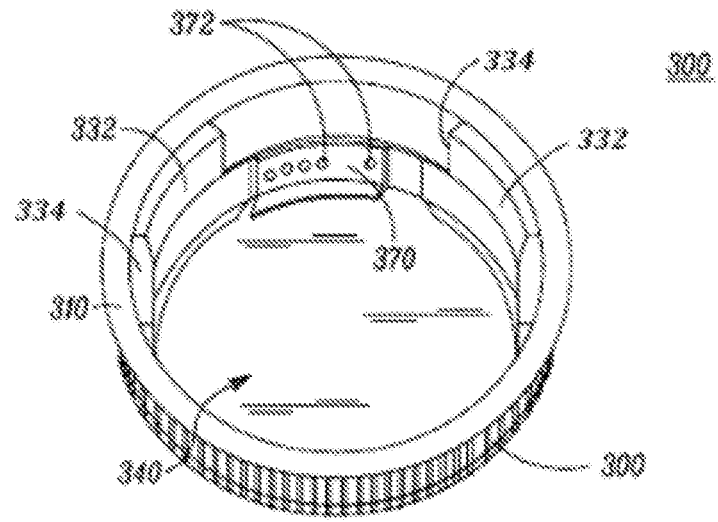
FIG. 4 is a perspective view of a first side of an exemplary lens cap.

FIG. 3 is an exploded view showing lens 200 and lens cap 300. As shown in FIG. 3, lens cap 300 may be removably attached to first end 210 of lens 200. FIG. 4 is a perspective view of a first side 310 of lens cap 300. In some embodiments, lens cap 300 may comprise a side wall 330 extending to form a cavity 340 at the first side 310. Referring to FIGS. 3 and 4, lens cap 300 may include cap attachment features, and lens 200 may include lens attachment features. In some embodiments, lens cap 300 may be attached to the first end 210 through a threaded fastening interaction. For example, lens cap 300 may include a cap threaded portion 332 located on the first side 310 of lens cap 300. In some embodiments, cap threaded portion 332 may be located on side wall 330 within cavity 340. Threaded portion 332 may be configured to engage first end 210 of lens 200. In some embodiments, first end 210 of lens 200 may include a lens threaded portion 240. Cap threaded portion 332 may threadingly engage lens threaded portion 240 to attach lens cap 300 to lens 200. In some examples, cap threaded portion 332 is configured to rotate and lock in to a retaining position between lens threaded portion 240 and another surface of lens 200.

In some embodiments, attachment stops may be located on lens 200 and/or lens cap 300. The attachment stops may be used to position the lens cap 300 to lens 200 in a particular orientation in an attached position. Attachment stops may include any physical attributes of either lens 200 or lens cap 300 that allow for particular orientation relative to each other in the attached position. In the example of FIGS. 3-4, lens 200 may have a first attachment stop 242 on the lens threaded portion 240. Lens cap 300 may have a second attachment stop 334 on the cap threaded portion 332. In some embodiments, first attachment stop 242 and second attachment stop 334 may contact each other when lens cap 300 is in an attached position. For example, lens cap 300 may be threaded onto lens 200 until the attached position where first attachment stop 242 and second attachment stop 334 abut against each other. In some embodiments, other surfaces of lens 200 and lens cap 300 may be the attachment stops. For example, a surface of the first end 210 of lens 200 may be configured to contact a surface of the first side 310 of lens cap 300 in the attached position.

It is further contemplated that lens cap 300 may be removably attachable to lens 200 using other methods, such as clips, fasteners, pins, or frictional tolerances. In some embodiments, such attachment methods may include first and second attachment stops of varying structure to locate the lens cap 300 on lens 200 in an attached position. For example, the first or second attachment stop may include a pin extending from a surface, and the other attachment stop may include an aperture defined in a surface such that the pin is received by the aperture in an attached position. In some embodiments, removably attachable may include a lens cap 300 that is moveable to and from the attached position. Lens cap 300 may be retained to one or more lenses, such as with straps, clips, and string.

Lens 200 may communicate with lens cap 300. For example, lens cap 300 may obtain lens information from lens 200. Lens 200 may include a lens memory capable of storing lens information. For example, lens information may include the different characteristics of lens 200, such as focal length, focal ratio, or lens manufacturer and/or brand name of lens.

Referring to FIG. 3, lens 200 may include a lens communication interface 250 configured to allow lens information to be communicated to external devices. In some embodiments, lens communication interface 250 may communicate lens information to camera body 110 when lens 200 is attached to camera body 110. In some embodiments, lens communication interface 250 may communicate lens information to lens cap 300. Lens communication interface 250 may comprise one or more electrical contacts 252. Electrical contacts 252 may comprise one or more pieces of electrically conductive material that allow electrical current to pass through them. Electrical contacts 252 may be resiliently biased towards an extended position such that electrical contacts 252 may slightly move or deform when attaching lens 200. Electrical contacts 252 may be in electrical communication with the lens memory. In some embodiments, Camera body 110 may include corresponding electrical contacts configured to contact lens electrical contacts 252 when lens 200 is attached to camera body 110. Lens information may be sent electronically through contacts 252 to contacts at camera body 110. Power may be supplied by a power supply located at lens 200, camera body 110, an external power source, or a combination thereof.

With continued reference to FIGS. 3 and 4, lens cap 300 may include a cap communication interface 370 configured to communicate with lens 200. In some embodiments, cap communication interface 370 may be configured to receive lens information from lens communication interface 250. In some examples, cap communication interface 370 can include electrical contacts 372. For example, lens cap 300 may include electrical contacts 372 that are located such that when lens cap 300 is in an attached position with the first end 210 of lens 200, the cap electrical contacts 372 at least partially align with the lens electrical contacts 252. Thus, lens cap 300 may be in electrical communication with lens 200 in the attached position. In some embodiments, lens cap 300 may receive lens information regarding lens 200 through electric signals transferred from lens electrical contacts 252 to cap electrical contacts 372. The lens cap 300 electrical contacts 372 are shown in FIG. 4 to be located on an interior surface of side wall 330, but it is contemplated that electrical contacts 372 may be located in several positions on first side 310 of lens cap 300. For example, electrical contacts 372 may be located on cap threaded portion 332 or on an interior surface perpendicular to side wall 330. Electrical contacts 252 may be any electrically conductive material that allow electrical current to pass through them. Electrical contacts 372 may be resiliently biased towards an extended position such that electrical contacts 372 may slightly move or deform when attaching lens cap 300.

In some embodiments, cap communication interface 370 may be configured to receive lens information through wireless communication with lens 200. For example, cap communication interface 370 and lens communication interface 250 may be each be configured to send and/or receive wireless signals, such that cap communication interface 37 need not be in physical or electrical contact with lens communication interface 250.

It is contemplated that lens information may be communicated between lens 200 and lens cap 300 in different ways. For example lens 200 may include conductive path from electrical contacts 252 to lens memory. An external device may be allowed to access or read lens memory to receive lens information. In some embodiments, lens 200 may be actively sending a signal with lens information to external devices.

In some embodiments, lens cap 300 may be configured to communicate with other lens caps. For example, lens cap 300 may be configured to wirelessly communicate with other nearby lens caps. In one embodiment, an input received at one lens cap 300 may be sent to nearby lens caps, such as a request to turn on a backlight on a display.

Figure 5:
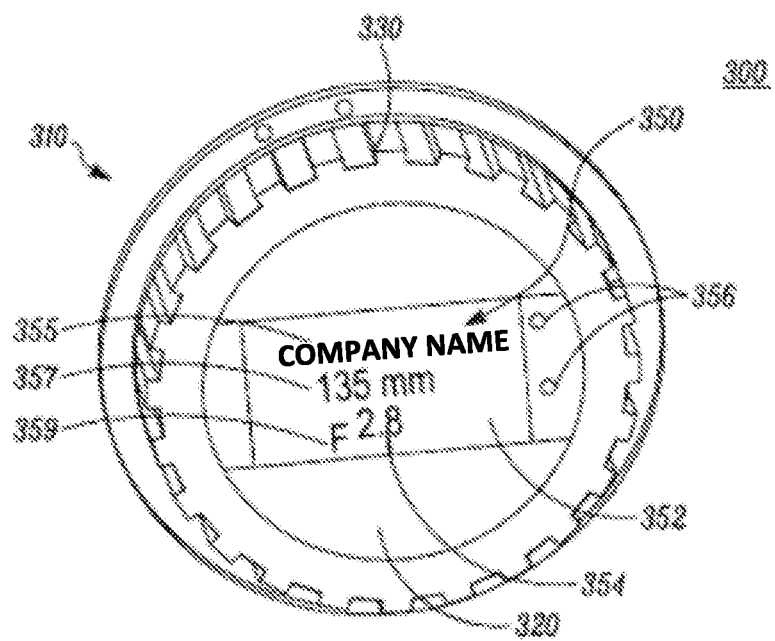
FIG. 5 is a perspective view of a second side of the lens cap of FIG. 4.

FIG. 5 is a perspective view of a second side 320 of lens cap 300. In some embodiments, display 350 is located on the second side 320 of lens cap 300. In some examples, lens cap 300 may be attached to the first end 210 of lens 200 such that the second side 320 of lens cap 300 faces a direction that is substantially away from lens 200. For example, second side 320 of lens cap 300 may be clearly visible in an attached position if lens 200 is stored vertically. While second side 320 may be shown substantially planar, a variety of shapes and designs are contemplated. Side walls 330 may extend substantially perpendicular from second side 320 as shown. In some examples, side walls 330 may include ridges, grooves, slots, or other surface irregularities to provide grip to a user.

For simplicity, display 350 shown in FIG. 5 may include a screen 352, a set of indicators 354, and inputs 356; however, other elements, such as lights, physical indicators, or audio emitters may be included in display 350.

In some embodiments, screen 352 may include any output device for presentation of lens information in visual, tactile, or audial form. For example, screen 352 may be a segment display capable of displaying text and numerical characters. In some embodiments, screen 352 may be a light-emitting diode (LED) display. In some embodiments, screen 352 may be a liquid-crystal display (LCD). Screen 352 may include lighting, and such lighting may include different colors. Screen 352 may convey lens information to a user through visual displays such as text or light colors, and may convey lens information through audial signals such as beeps or tones. Screen 352 may be backlit.

In some embodiments, indicators 354 may include indications of lens information and characteristics. For example, indicators 354 may include a lens manufacturer and/or brand name indicator 355 that indicates a particular brand or model of lens 200. In the example of FIG. 5, a brand indicator may indicate the brand Nikon®. In some embodiments, indicators 354 may include focal length indicator 357. For example, FIG. 5 may include a focal length indicator 357 that indicates an attached lens 200 has a focal length of 135 millimeters (mm). In some embodiments, indicators 354 may include a focal ratio indicator 359. In the example of FIG. 5, a focal ratio indicator 359 displays a focal ratio, or f-stop, of 2.8.

In some embodiments, inputs 356 may be included in display 350 on lens cap 300. Inputs may include any unit or units capable of interfacing with a person. In some embodiments, inputs 356 may include physical buttons. In some embodiments, inputs 356 may include digital inputs such as a touch screen display. Inputs 356 may be located on screen 352, or may be located elsewhere on lens cap 300. Inputs 356 may allow a user to turn on or off display 350, or select different lens information to view at screen 352. In some examples, inputs 356 may include ports to receive signals from input units located external to lens cap 300. Inputs 356 may also be configured allow a user to program what is displayed by lens cap 300. In some embodiments, display 350 may be programmed to perform certain determinations or functions through interaction with inputs 356.

In some embodiments, lens cap 300 may include a cap computing device to request, receive, determine, or interpret lens information relating to lens 200. Cap computing device may include one or more elements of computing device 400 of FIG. 6. For example, the cap computing device may receive a signal from lens communicating unit 250 containing lens information. In some examples, cap computing device may configure lens information to be displayed on display 350. Similar to lens 200 interacting with camera body 110, lens information may be communicated to lens cap 300 in different ways. In one embodiment, a processor located at cap computing device may send a request for lens information.

Figure 6:
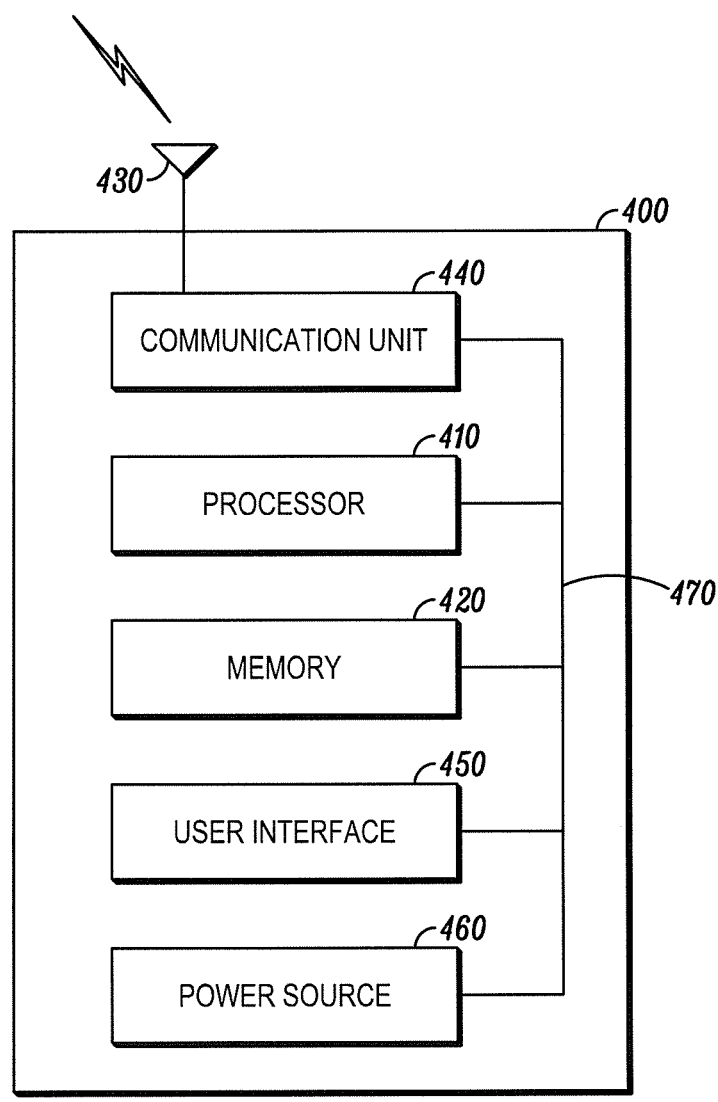
FIG. 6 is a block diagram showing an exemplary hardware configuration for a computing device in a lens cap.

FIG. 6 is a block diagram showing an exemplary hardware configuration for a computing device that may be present in lens cap 300. In some embodiments, lens cap 300 may include a computing device 400 to receive and interpret lens information signals from lens 200. Computing device 400 may include a processor 410, a memory 420, a communication interface 430, an electronic communication interface 440, a user interface (UI) 450, a power source 460, or any combination thereof.

In some embodiments, a computing device may include units, or elements not shown in FIG. 6, such as a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, or any combination thereof.

The processor 410 may include any device or combination of devices capable of manipulating or processing a signal or other information now-existing or hereafter developed, including optical processors, quantum processors, molecular processors, simple electrical circuitry, or a combination thereof. The processor 410 may be operatively coupled with the memory 420, the electronic communication interface 430, the electronic communication interface 440, the user interface (UI) 450, the power source 460, or any combination thereof. For example, the processor may be operatively couple with the memory 420 via a communication bus 470.

The memory 420 may include any tangible non-transitory computer-usable or computer-readable medium, capable of, for example, containing, storing, communicating, or transporting machine readable instructions, or any information associated therewith, for use by or in connection with the processor 410.

The communication interface 430 may be a wireless antenna, a wired communication port, an optical communication port, or any other wired or wireless unit capable of interfacing with a wired or wireless electronic communication medium. For example, communication interface 430 may include electrical contacts 372 shown in FIG. 4.

The communication unit 440 may be configured to transmit or receive signals via communication interface 430. Although not explicitly shown in the Figures, the communication unit 440 may be configured to transmit, receive, or both via any wired or wireless communication medium, such as radio frequency (RF), ultra violet (UV), visible light, fiber optic, wire line, or a combination thereof. For example, communication unit 440 may be in communication with electrical contacts 373.

The UI 450 may include any unit capable of interfacing with a person, such as a virtual or physical keypad, a touchpad, a display, a touch display, a speaker, a microphone, a video camera, a sensor, a printer, or any combination thereof.

The UI 450 may be operatively coupled with the processor 410, as shown, or with any other element of the computing device 400, such as the power source 460. Although shown as a single unit, the UI 450 may include one or more physical units. For example, the UI 450 may include display 350 and inputs 356 as shown in the Figures.

The power source 460 may be any suitable device for powering the computing device. For example, the power source 460 may include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 400. The processor 410, the memory 420, the electronic communication interface 430, the electronic communication interface 440, the user interface (UI) 450, or any combination thereof, may be operatively coupled with the power source 460.

In some embodiments, lens 200 may include a lens computing device. For example, lens computing device may include one or more elements of computing device 500 of FIG. 7. The lens computing device may include a processor or microprocessor. The lens computing device may also include a power source. In some embodiments, the lens computing device may read lens information from the lens memory and send it through lens communication interface to external devices, such as camera body 110 or lens cap 300. In one embodiment, a processor located at lens 200 may determine an external device is attached, and send lens information from lens memory.

Figure 7:
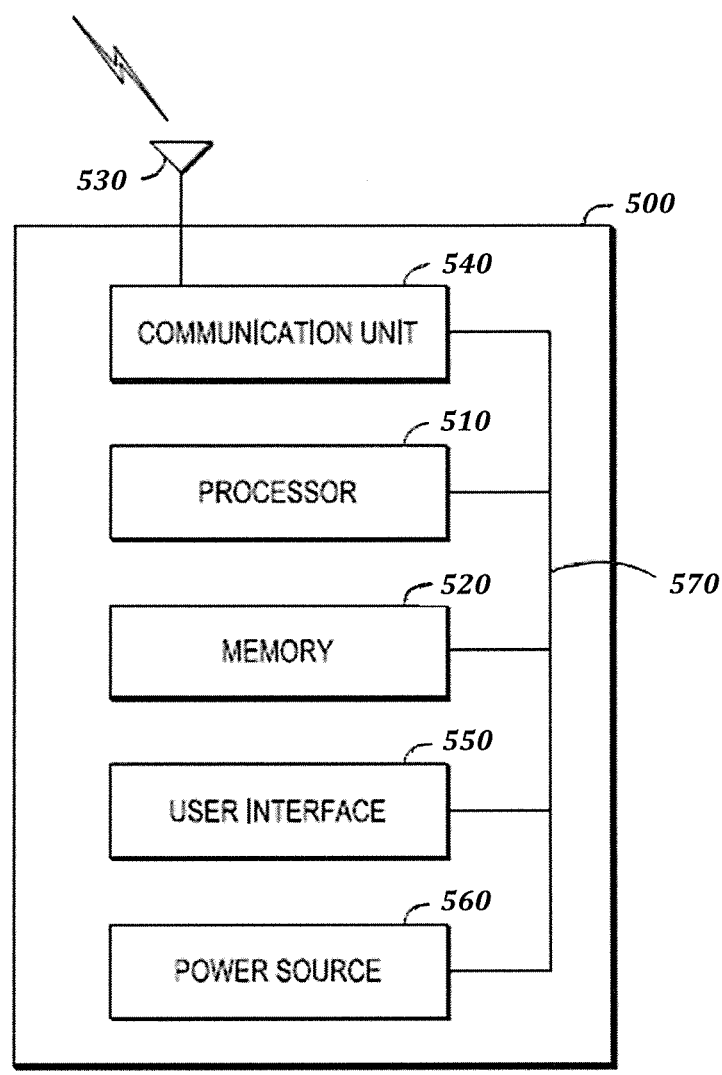
FIG. 7 is a block diagram showing an exemplary hardware configuration for a computing device in a lens.

FIG. 7 is a block diagram showing an exemplary hardware configuration for a computing device that may be present in lens 200. In some embodiments, lens 200 may include a computing device 500 to receive a request for lens information or to transmit lens information signals to an attached device. Computing device 500 may include a processor 510, a memory 520, a communication interface 530, an electronic communication interface 540, a user interface (UI) 450, a power source 560, or any combination thereof.

In some embodiments, a computing device may include units, or elements not shown in FIG. 7, such as a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, or any combination thereof.

The processor 510 may include any device or combination of devices capable of manipulating or processing a signal or other information now-existing or hereafter developed, including optical processors, quantum processors, molecular processors, simple electrical circuitry, or a combination thereof. The processor 510 may be operatively coupled with the memory 520, the electronic communication interface 530, the electronic communication interface 540, the user interface (UI) 550, the power source 560, or any combination thereof. For example, the processor may be operatively couple with the memory 520 via a communication bus 570.

The memory 520 may include any tangible non-transitory computer-usable or computer-readable medium, capable of, for example, containing, storing, communicating, or transporting machine readable instructions, or any information associated therewith, for use by or in connection with the processor 510. For example, memory 520 may be the lens memory that includes lens information stored therein.

The communication interface 530 may be a wireless antenna, a wired communication port, an optical communication port, or any other wired or wireless unit capable of interfacing with a wired or wireless electronic communication medium. For example, communication interface 530 may include electrical contacts 252 shown in FIG. 3.

The communication unit 540 may be configured to transmit or receive signals via communication interface 430. Although not explicitly shown in the Figures, the communication unit 540 may be configured to transmit, receive, or both via any wired or wireless communication medium, such as radio frequency (RF), ultra violet (UV), visible light, fiber optic, wire line, or a combination thereof. For example, communication unit 540 may in communication with electrical contacts 252.

The UI 550 may include any unit capable of interfacing with a person, such as a virtual or physical keypad, a touchpad, a display, a touch display, a speaker, a microphone, a video camera, a sensor, a printer, or any combination thereof. The UI 550 may be operatively coupled with the processor 510, as shown, or with any other element of the computing device 500, such as the power source 560.

The power source 560 may be any suitable device for powering the computing device. For example, the power source 460 may include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 500. The processor 510, the memory 520, the electronic communication interface 530, the electronic communication interface 540, the user interface (UI) 550, or any combination thereof, may be operatively coupled with the power source 560.

The above-described aspects, examples, and implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A lens cap assembly, comprising:
   a lens cap body configured to be removably attached to an end of a lens such that the lens cap is at least partially covering an aperture of the lens when the lens cap body is in an attached position;
   a cap communication interface configured to receive lens information from the lens when the lens cap body is in the attached position; and
   a display configured to display the lens information.

2. The assembly of claim 1, wherein the lens information comprises at least one of a focal length, a focal ratio, and a type or brand name of the lens.

3. The assembly of claim 1, wherein the display includes a screen that is a light-emitting-diode (LED) or a liquid-crystal display (LCD).

4. The assembly of claim 1, wherein the display is configured to change a visual color based on the lens information.

5. The assembly of claim 1, wherein the end of the lens further comprises a lens thread portion and the lens cap further comprises a cap thread portion, wherein the cap thread portion is configured to threadingly engage the lens thread portion.

6. The assembly of claim 5, wherein the cap thread portion includes an attachment stop configured to be in stopping abutment with a portion of the lens when in the attached position.

7. The assembly of claim 1, wherein the lens cap further comprises a processor in electrical communication with the cap communication interface, and the processor is configured to receive lens information from the lens and transmit the lens information to the display.

8. The assembly of claim 1, wherein the cap communication interface is in electrical communication with at least one electrical contact of the lens when in the attached position.

9. The assembly of claim 1, wherein the display further comprises inputs configured to receive input from a user.

10. The assembly of claim 9, wherein the inputs comprise buttons integrated with the display.

11. The assembly of claim 9, wherein the inputs are configured to turn on or off the display.

12. The assembly of claim 1, wherein the lens cap body further comprises at least one wall forming a cavity at a first side of the lens cap body such that a portion of the lens is received in the cavity in the attached position.

13. A removable lens cap assembly for a camera lens, comprising:
    a lens cap body configured to be removably attached to an end of a lens; and
    a display on the lens cap body configured to display lens information received from the lens when the lens cap body is in an attached position.

14. The assembly of claim 13, wherein the lens information comprises at least one of a focal length, a focal ratio, and a type or brand name of the lens.

15. The assembly of claim 13, wherein the lens cap body further comprises a cap thread portion configured to threadingly engage a threaded portion of the lens.

16. The assembly of claim 13, wherein the lens cap assembly is attachable to lenses having different lens information.

17. The assembly of claim 13, wherein the lens cap further comprises a cap communication interface in communication with the lens in the attached position.

18. The assembly of claim 13, wherein the display further comprises inputs configured to receive input from a user.

19. The assembly of claim 13, wherein the lens cap body further comprises at least one wall forming a cavity at a first side of the lens cap body such that a portion of the lens is received in the cavity in the attached position.

* * * * *